United States Patent [19]
Clawson

[11] Patent Number: 4,665,628
[45] Date of Patent: May 19, 1987

[54] RECUPERATIVE CLOTHES DRYER WITH ENHANCED RECIRCULATION AND AIR FLOW

[75] Inventor: Lawrence G. Clawson, Dover, Mass.

[73] Assignee: Raytheon Company, Lexington, Mass.

[21] Appl. No.: 846,549

[22] Filed: Mar. 31, 1986

[51] Int. Cl.<sup>4</sup> ............................ F26B 3/04; F26B 11/04
[52] U.S. Cl. ............................................. 34/23; 34/35; 34/86; 34/131; 34/133
[58] Field of Search .................... 34/133, 77, 131, 126, 34/86, 35, 23; 432/112, 113, 105

[56] References Cited

U.S. PATENT DOCUMENTS

| | | | |
|---|---|---|---|
| 2,418,239 | 4/1947 | Smith | 34/77 |
| 2,694,867 | 11/1954 | Smith | |
| 3,066,422 | 12/1962 | Douglas | |
| 3,121,000 | 2/1964 | Hubbard | 34/133 |
| 3,624,919 | 12/1971 | Miller | 34/133 |
| 4,015,930 | 4/1977 | Grantham | 34/133 |
| 4,275,510 | 6/1981 | George | 34/133 |
| 4,471,537 | 9/1984 | Meda | 34/77 |

Primary Examiner—Larry I. Schwartz
Attorney, Agent, or Firm—William R. Clark; Richard M. Sharkansky

[57] ABSTRACT

A clothes dryer operating with a very high volume of air flow across the clothes thereby enabling a high percentage of air recirculation without sacrifice to drying time or efficiency. A cylindrical clothes drum is surrounded by an air tight casing. Radial perforations are formed along the entire cylindrical wall of the drum. Drying air is forced axially into the drum and radially expelled through the perforations. By expelling the air through the total area of all perforations, a high air flow is maintained without increasing exit velocity. The expelled air is drawn back between the drum and casing towards the drum air inlet. Over 80% of the expelled air is recirculated back into the drum resulting in expelled air having a high water vapor content. Consequently, the energy per pound of exhaust air is increased sufficiently to heat water for direct use in washing machines. In another embodiment, the high air flow is used to advantage with a lower percentage of recirculation to achieve reduced drying time.

28 Claims, 8 Drawing Figures

RECUPERATIVE CLOTHES DRYER WITH ENHANCED RECIRCULATION AND AIR FLOW

BACKGROUND OF THE INVENTION

The invention relates generally to clothes dryers such as, for example, commercial dryers used in self-service laundries. In a conventional dryer, heated air is forced through a rotating drum for evaporating moisture from damp clothes tumbling therein. Air expelled from the drum is then channeled to an exhaust outlet through a duct or series of ducts.

In an effort to conserve energy, many dryers incorporate an additional duct to recirculate a portion of the expelled air back into the drum. However, drying time imposes a limit on the amount of moist air which may be recirculated. Both commercial and residential dryers have therefore limited the amount of recirculated air to less than 60% of the total air entering the drum.

To further conserve energy, various systems have been employed to transfer heat from a dryer exhaust to heat water for use in washing machines. For example, U.S. Pat. No. 4,275,510 discloses a heat pipe coupled between the exhaust of a dryer and the feed water of a water heater for preheating water. U.S. Pat. No. 4,412,391 discloses a heating chamber positioned in the underside for a conventional hot water tank and coupled to the exhaust of a dryer for pre-heating wash water. However, the previous systems have only been able to pre-heat wash water. They have been unable to heat the water to normal water supply temperatures due to the relatively low $\Delta T$ between dryer exhaust air and water supply.

Another problem exists for heat recovery from dryers wherein combustion gases from gas burners enter the dryer drum. Combustion gases such as, for example, hydrogen chloride, carbon dioxide, nitrogen dioxide and hydrogen fluoride may combine with water vapor condensate to respectively form hydrochloric acid, carbonic acid, nitric acid and hydrofluoric acid. These acids may corrosively attack heat exchangers which are coupled to the dryer exhaust.

The conventional approaches to clothes drying and heat recovery have an additional disadvantage. That is, the ducts required to exhaust air and recirculate air have added to the size, complexity and thermal mass of the dryer. Increased thermal mass prolongs warm up time, reduces drying efficiency and dissipates exhaust heat which may otherwise be recovered.

SUMMARY OF THE INVENTION

The present invention overcomes the above problems and disadvantages by the provision of an apparatus for drying clothes, comprising a drum having a perforated circumferential wall and a backend with a drum air inlet, a recirculation passageway between said perforations and said drum air inlet, said recirculation passageway including both said circumferential wall and said backend, and means for moving air into said drum air inlet and expelling said air radially through said perforations, said moving means also drawing a portion of said expelled air through said recirculation passageway and into said drum air inlet. By recirculating a large percentage of air, the water vapor content of the air is substantially increased. Thus, the energy per pound of air which may be recovered through a condensing heat exchanger is substantially increased.

The invention further defines an apparatus for drying clothes, comprising a cabinet having an opening for receiving clothes, a clothes drum having a front opening communicating with the cabinet opening for receiving clothing, a backend, and a perforated circumferential wall, the backend including a drum air inlet, means for rotating the drum, a housing spatially separated from and encapsulating both the drum backend and the drum circumferential wall, an air recirculation path contiguous to both the drum circumferential wall and the drum backend, the recirculation path being defined by the spacing between the housing and both the drum circumferential wall and the drum backend, an ambient air inlet coupled to the recirculation path, a fan located at the drum air inlet for forcing air into the drum and expelling the air radially out through the drum perforations, the fan drawing a portion of the expelled air longitudinally back through the recirculation path and into the drum air inlet thereby recirculating a portion of the expelled air, the fan also drawing ambient air from the ambient air inlet into the drum inlet, a heater positioned in the recirculation path for heating the air which eventually is drawn into the drum inlet, an exhaust outlet coupled to the recirculation path, and an exhaust blower coupled to the exhaust outlet for exhausting air from the drum by drawing the remaining portion of the expelled air from the recirculation path through the exhaust outlet. The air drawn by the exhaust blower may be varied to vary the percentage of expelled air which is recirculated back into the drum air inlet. The lower the percentage, the faster the drying time. The higher the percentage, the greater the water vapor content of the exhaust air and, therefore, the greater the energy per pound of exhaust air which may be recovered in a condensing heat exchanger. It may be preferable for the drying apparatus to further comprise a chamber coupled to the exhaust blower, a condensing heat exchanger comprising a tube and fin heat exchanger positioned within the chamber, the fins being positioned in the chamber in a substantially vertical direction wherein the exhaust air flows upwardly along the fins, the tubes forming a downward flow path wherein water to be heated flows in a substantially downward direction through the tubes, the water being heated by thermal transfer of sensible heat from the exhaust air and from heat of condensation released by a portion of the exhaust air condensing on the fins, the condensate flowing downward along the fins in a direction substantially opposite the flow of the exhaust air. The downward flowing condensate flushes away highly acidic condensate which would otherwise corrosively attack the heat exchanger. The downward flowing condensate also flushes away clothing lint paticles from the heat exchanger. Condensing heat exchangers are herein defined as heat exchangers which cool exhaust air sufficiently to condense.

BRIEF DESCRIPTION OF THE DRAWINGS

The foregoing and other objects and advantages of the invention will be more readily understood by reading the Description of the Preferred Embodiment with reference to the Drawings wherein.

DESCRIPTION OF THE PREFERRED EMBODIMENT

Figure 1:
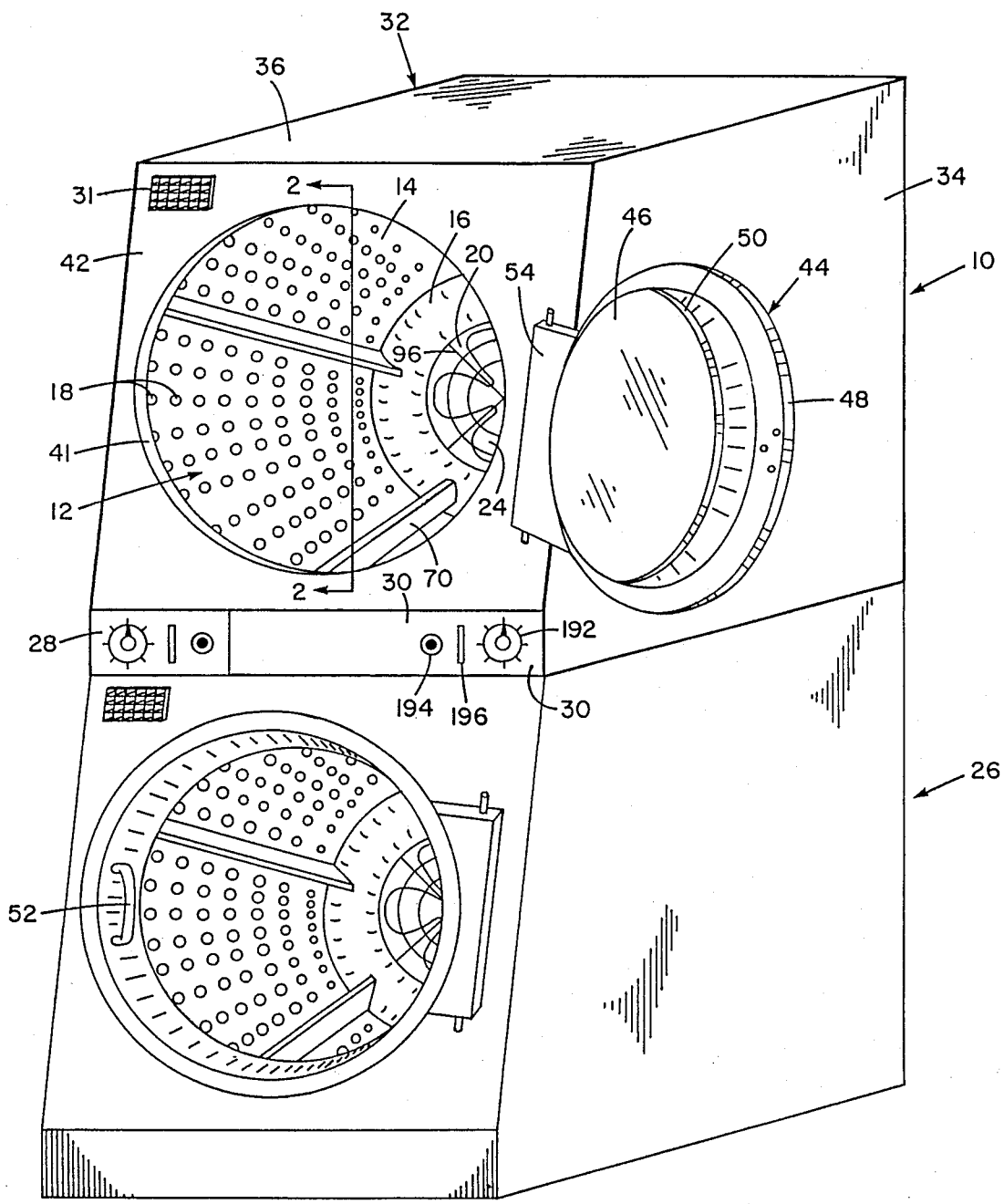
FIG. 1 is a perspective view of dryer 10 shown mounted on top of a similar dryer 26.
Figure 2:
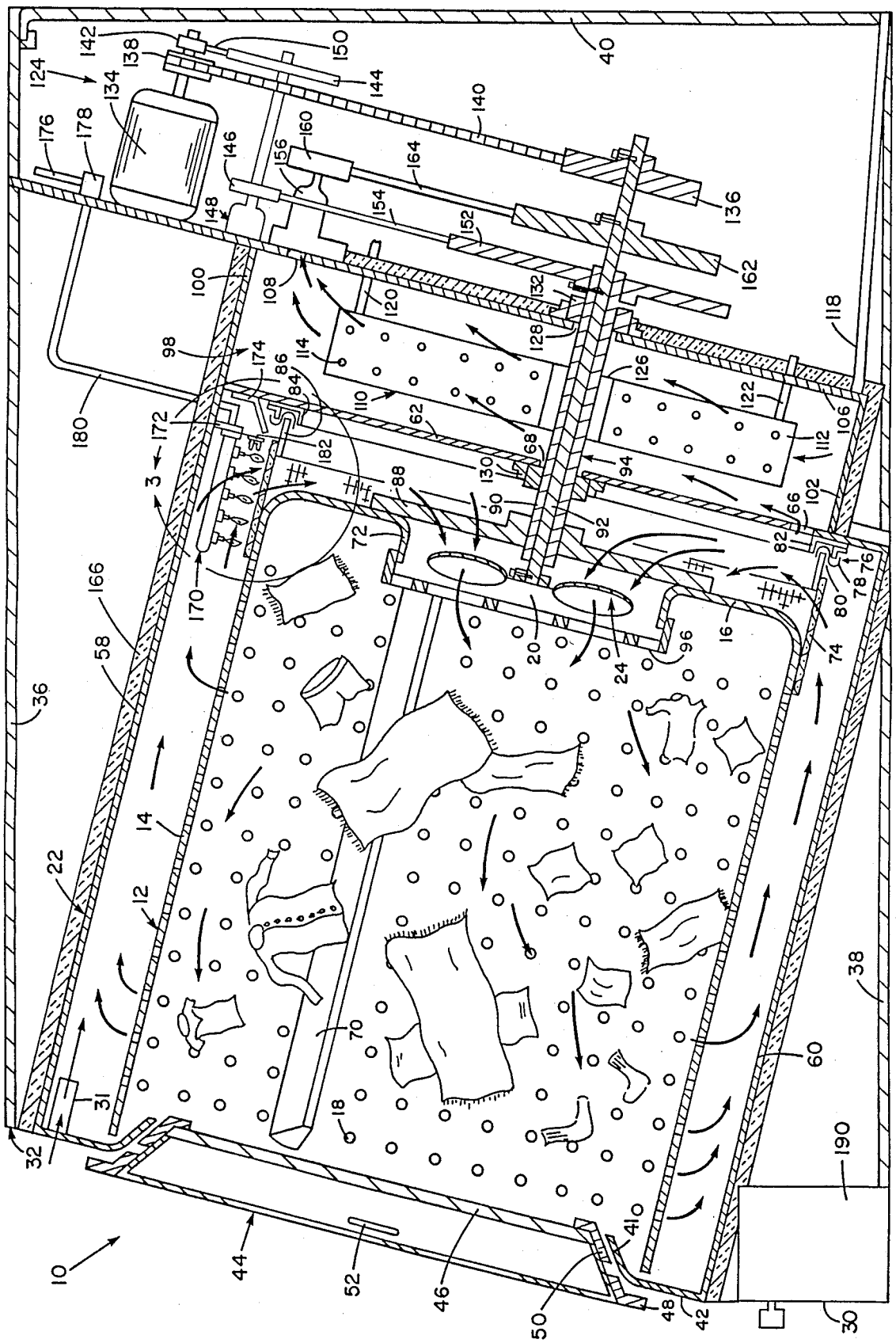
FIG. 2 is a sectional view of dryer 10 taken along line 2—2 of FIG. 1.

Referring to FIGS. 1 and 2, a commercial dryer 10 is illustrated. Dryer 10 broadly comprises rotating clothes drum 12 having circumferential wall 14 and drum back-end or backwall 16. Circumferential wall 14 includes drum exit ports or perforations 18. Backwall 16 includes drum air inlet 20. Substantially air tight casing or drying compartment 22 surrounds walls 14 and 16 of drum 12. Axial fan 24 or other suitable air moving means is coupled to the drum air inlet 20 for moving air into drum 12, across the clothes tumbling therein and expelling the air radially out through perforations 18. A portion of the air expelled from perforations 18 is drawn by fan 24 longitudinally back between circumferential wall 14 and casing 22 and recirculated back into drum 12 through drum air inlet 20. In the embodiment shown, and as described in greater detail hereinafter, over 80% of the air expelled through perforations 18 is recirculated back into drum inlet 20.

Continuing with FIG. 1, dryer 10 is shown stacked on top of a similar dryer 26. For reasons described hereinafter, dryer 10 is sufficiently compact to enable stacking a pair of dryers in approximately the same space required for a single conventional dryer. Dryer 26 is of nearly identical construction to dryer 10 except that control panel 28 of dryer 26 is here shown integrated with control panel 30 of dryer 10 thereby elevating control panel 28 above ground level for operator convenience.

Dryer 10 includes an outer cabinet 32 having side walls 34, ceiling 36, frontwall 42, bottom 38 (FIG. 2) and backwall 40 (FIG. 2). Frontwall 42 includes circular flange 41 around circular opening 43 (FIG. 2). Control panel 30 and air inlet 31 are coupled to frontwall 42. Door 44 having recessed glass panel 46, outer seal 48, inner seal 50 and handle 52 is attached to front wall 42 by a conventional hinge assembly 54. Outer seal 48 and inner seal 50 provide a substantially air tight seal against front wall 42 and flange 41, respectively, when door 44 is in the closed position.

Shown mounted on control panel 30 are operator actuable controls including timer 192, start button 194 and coin entry slot 196. These controls are coupled to controller 190 which is located behind control panel 30 as illustrated in FIG. 2. Controller 190 controls various dryer 10 components throughout the drying cycle including ceramic igniter tip 182, gas valve 178 and motor 134. Controller 190 is also coupled to temperature sensor 198 (not shown), preferably a thermistor, to maintain constant drum air inlet temperature by thermostatically controlling burner 170 in a conventional manner. Other conventional dryer components and operator actuable controls may be coupled to controller 190 such as, for example, temperature selections, fabric selections and safety interlocks. These components, however, are not illustrated or described herein since they are well known in the art and not necessary for an understanding of the invention.

A more detailed description of dryer 10 is now given. Referring back to FIG. 2, open rectangular drying compartment or casing 22 is shown having top wall 58, bottom wall 60, backwall 62 and side walls 64 (FIG. 5) spatially separated for encapsulating drum 12. Backwall 62 includes exhaust outlet 66 and shaft opening 68. Walls 58, 60 and 64 are welded or attached in a substantially air tight manner to frontwall 42 of cabinet 32. Accordingly, casing 22 communicates with inlet air vent 31, door 44 and exhaust outlet 66.

Drum 12 is concentrically positioned within casing 22 in a cantilevered fashion by the interconnection of drum 12, radial beam 88 and axial drum shaft 90 of drive shaft 94. Axial fan 24 is positioned within drum air inle 20 and connected to fan shaft 92 of drive shaft 94. Drum air inlet 20 is surrounded by baffle 72 having fan guard 96 attached thereto to prevent the intrusion of clothing against fan 24. Three axial ribs 70, spaced 120° apart, are connected to the interior of drum 12 for tumbling the clothing in a conventional manner. To enhance the tumbling of clothing, both drum 12 and casing 22 are positioned within cabinet 32 at a downward inclination such as, for example, 10°.

Cylindrical lint filter or screen 74, preferably constructed of a meshed material able to withstand high temperatures without distortion such as, for example, stainless steel is attached to circumferential wall 14 and extends outwardly from drum 12 towards back wall 62 of drying compartment 22. As may be seen more clearly in FIG. 3, circular seal 76 is attached to compartment backwall 62 and coaxially aligned with screen 74. Seal 76 is defined by grooved ring 78, preferably constructed of a pliable heat resistant material having low sliding frictional losses such as synthetic resin polymer, fitted into a circular channel 80 between inner concentric ring 82 and outer concentric ring 84. Cylinder extension 86, preferably constructed from synthetic resin polymer, is attached to screen 74 and extends therefrom into grooved ring 78 of seal 76. Exhaust outlet 66 is connected to compartment backwall 62 within the perimeter of seal 76. Accordingly, all the air entering drum air inlet 20 and all the air entering exhaust outle 66 must pass through screen 74. Further, screen 74 is free to rotate within seal 76 as drum 12 rotates.

A conventional atmospheric gas burner 170 is positioned over screen 74 and attached to top wall 58 of compartment 22 by assembly 172. Shield 174 is positioned between burner 170 and seal 76 to prevent high temperature distortion of the synthetic resin polymer materials. Burner 170 is connected to gas inlet pipe 176 by the series interconnection of electronically controlled gas valve 178 and pipe 180. Ceramic igniter tip 182 which is adjacently positioned to burner 170 on assembly 174 and gas valve 178 are connected (not shown) to control circuitry 190.

Figure 6:
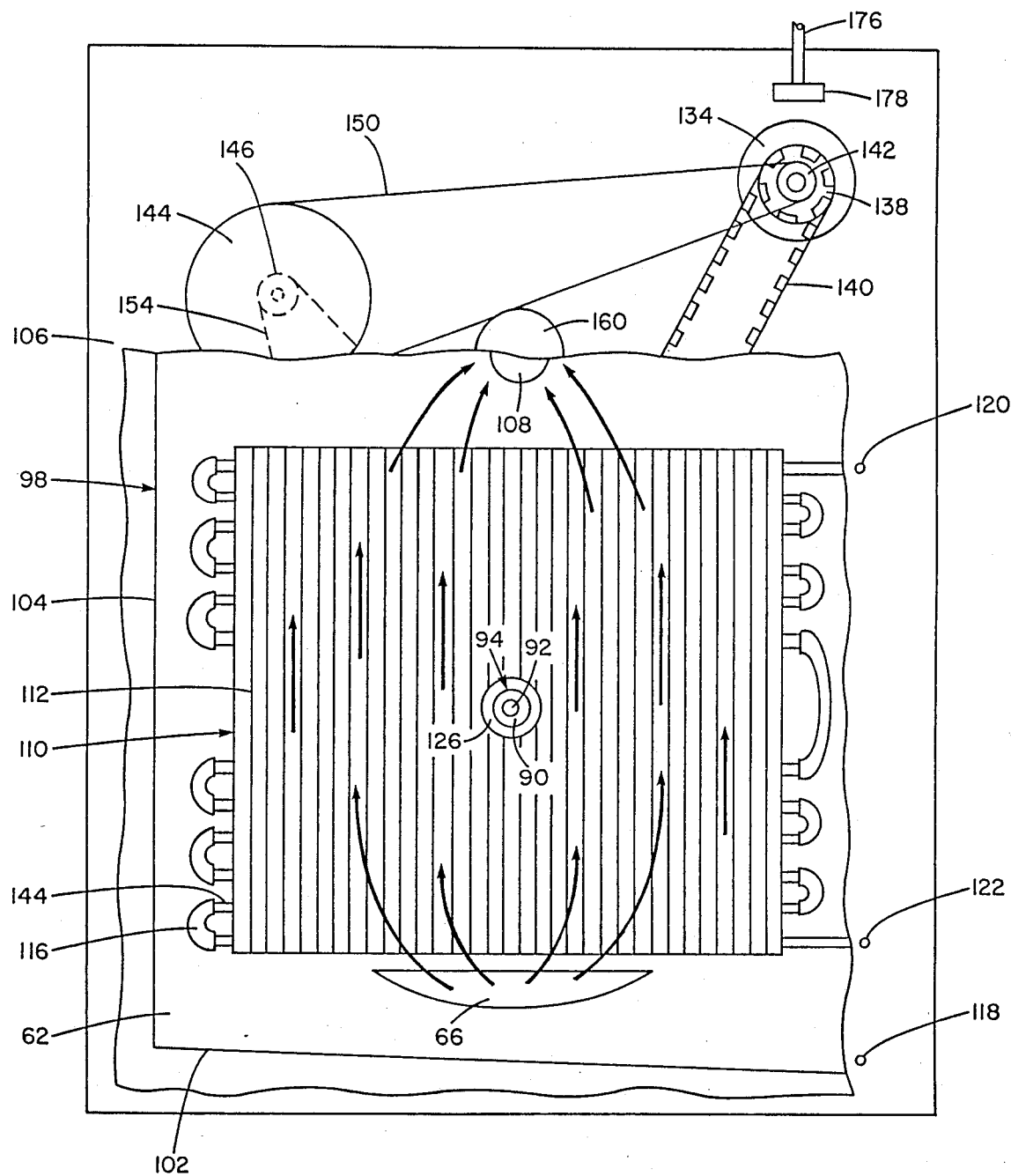
FIG. 6 is a view of FIG. 4 with a portion of rear wall 106 of exhaust air compartment 98 partially broken away to show heat exchanger 110.

Continuing with FIG. 2, and also referring to FIG. 6, exhaust air compartment 98 having top wall 100, bottom wall 102, side walls 104 (FIG. 6) and backwall 106 is shown. Walls 100, 102 and 104 are welded or connected in a substantially air tight manner to backwall 62 of drying compartment 22. Exhaust outlet 66 is backwall 62 and flue outlet 108 in backwall 106 of compartment 98 enable exhaust air from casing 22 to upwardly flow through compartment 98.

A condensing heat exchanger 110 having vertical fins 112 connected in heat transfer relationship with horizontal tubes 114 is vertically positioned within exhaust compartment 98. Tubes 114 are interconnected in series by elbows 116 (FIG. 6) to form a downward zig zag flow path between cold water inlet 120 and hot water outlet 122.

The spacing between backwall 106 of exhaust compartment 98 and backwall 40 of cabinet 32 defines motor compartment 124. Drive shaft 94 extends from shaft opening 128 in backwall 106, through shaft opening 126 in heat exchanger 110, through shaft opening 68 in compartment 22 and into drum air inlet 20. Bearing 130 and bearing 132 are respectively positioned over shaft openings 68 and 128 for supporting drive shaft 94 and sealing the shaft openings from air leakage. Drive shaft 94 includes outer drum shaft 90 and inner fan shaft 92 separated by conventional means such as bearings (not shown).

Figure 4:
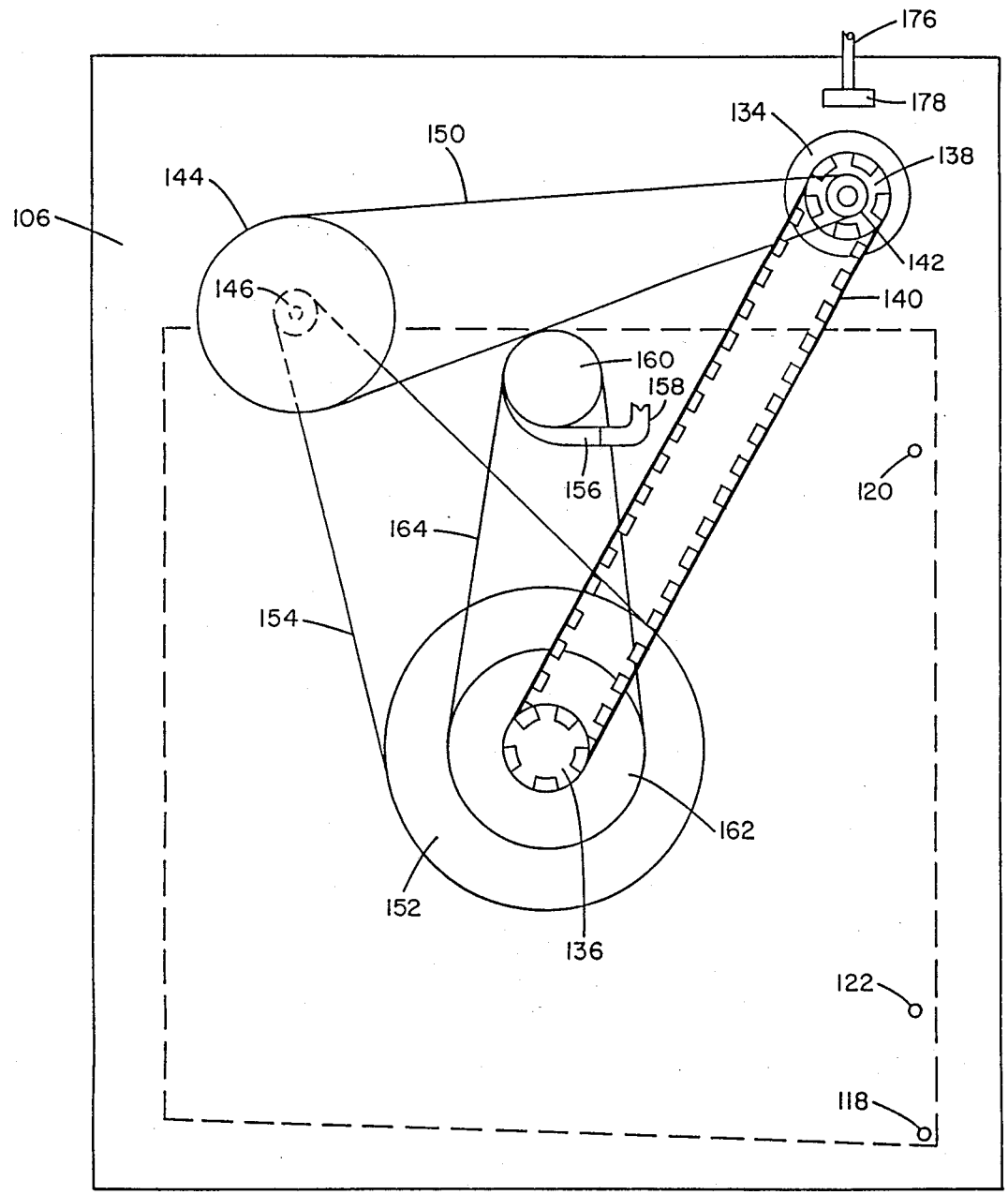
FIG. 4 is a rear elevation view of dryer 10 with rear panel 40 removed and looking into drive shaft 94 which is axially aligned with drum 12.

Referring to FIG. 4, and continuing with FIG. 2, fan shaft 92 is coupled to variable speed electric motor 134 by means of fan shaft sprocket 136, motor sprocket 138 and interconnecting chain 140. Drum 12 is coupled to electric motor 134 by beam 88, drum shaft 90, drum shaft pulley 152, interconnecting belt 154, inner pulley 146 and outer pulley 144 of reduction assembly 148, interconnecting belt 150 and motor pulley 142. Exhaust blower 156 is coupled to electric motor 134 by blower pulley 160, fan shaft pulley 162 and interconnecting belt 164. Blower 156 is connected to flue outlet 108 of exhaust compartment 98 for drawing exhaust air therefrom.

The aforementioned pulleys and sprockets have diameters selected in a conventional manner to achieve the desired air flows for fan 24 and blower 156, and the desired rotation for drum 12.

Figure 5:
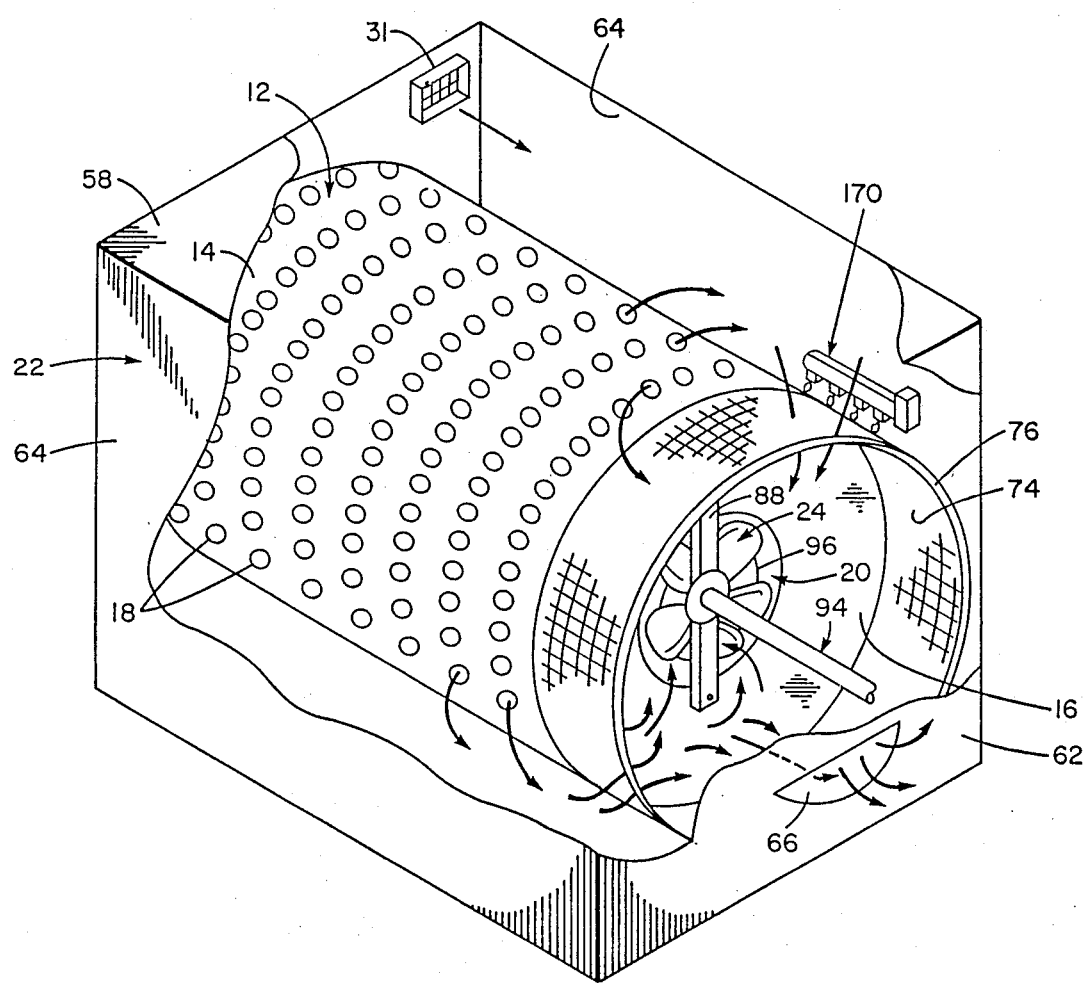
FIG. 5 is an isometric view of casing 22 shown partially broken away to show drum 12 and lint screen 74.

In accordance with the above description, and referring to FIGS. 2 and 5, the operation of dryer 10 is now described. The parameters described herein with respect to air flows, drum rotation and temperature are meant to be illustrative only and not limiting. Those skilled in the art will recognize that the invention described herein may be used o to advantage with a wide range of parameters.

Upon operator insertion of the proper coinage into coin entry slot 196, actuation of timer 192 and start button 194 on control panel 130 (FIG. 1), control circuitry 190 sequentially activates ingiter 182, gas valve 178 and motor 134 in a conventional manner well known by those skilled in the art. Burner 170, which is thermostatically controlled by control circuitry 190, fires radially into screen 74 to maintain drum air inlet temperatures of approximately 200° F. Approximately 1500 cfm of the heated air is forced by fan 24 into drum 12 and over the clothes tumbling therein. The air flowing across the clothes, which is at approximately twice the flow of conventional dryers, carrys away moisture and lint from the clothes as the air is radially expelled from drum 12 through all perforations 18. To maintain a relatively low exit velocity of approximately 6 fps through perforations 18, it is necessary that substantially the entire surface area of circumferential wall 14 be perforated. Thus, the total cross-sectional area through which the air is expelled is maximized thereby maintaining conventional exit velocities with double the air flow through the dryer. Otherwise, the air forced into drum 12 would result in sufficiently high exit velocities to impel the clothes against drum 12 thereby impeding the flow of air through drum 12 and also impeding the tumbling of clothes within drum 12.

Fan 24 also draws the expelled air from perforations 18 longitudinally back between circumferential wall 14 and compartment 22, and radially through screen 74. Lint carried by the expelled air is deposited on screen 74 as the air passes therethrough. Concurrently, exhaust blower 156 draws approximately 100 cfm of the expelled air passing through screen 74 into exhaust outlet 66. Thus, the remaining 1400 cfm of expelled air will be recirculated back into drum inlet 20 by fan 24. In addition, fan 24 draws approximately 100 cfm of replacement or ambient air from air inlet vent 31 longitudinally back between circumferential wall 14 and compartment 22, and radially through screen 74 into drum air inlet 20. The mixture of ambient air and recirculated air is heated to by burner 170 before being drawn through drum air inlet 20 by fan 24. A drum inlet air temperature of approximately 200° F. is maintained to maximize the capacity of air to hold water vapor while avoiding fabric damage to the clothes as they dry out.

It follows from the foregoing that over 90% of the air entering drum 12 is recirculated air. This high percentage of recirculation over damp clothes results in exhaust air having a dew point of 135° F. when steady state temperatures are reached. On the other hand, the dew point would only be between 90° F.–100° F. if a conventional 50% air recirculation was utilized. Consequently, the latent heat of vaporization which may potentially be recovered from the water vapor content of a given mass of exhaust air is increased approximately fourfold by increasing the percentage of recirculation to over 90%. This is especially important considering the low exhaust temperatures of clothes dryers. More specifically, at an exhaust temperature of 167° F. and dew point of 135° F., the enthalpy or BTU per pound of exhaust air which may potentially be recoverd from latent heat of vaporiation is 139 BTU/lb. The enthalpy which may be recovered from sensible heat (mc $\Delta T$) is only 40 BTU/lb. Thus, high recirculation results in dramatically higher total exhaust enthalpy which may be used to advantage. For example, the high enthalpy output exhaust may be used to heat water to high temperature in heat exchanger 110 as described hereinafter.

Even though high recirculation has substantially increased the water vapor content of recirculated air, drying time has not been impaired due to the high volume of air forced through drum 12. In addition, the increase in air flow does not require a proportional increase in burner input to maintain constant air inlet temperature due to the high recirculation. With the drum inlet air composed of a mixture of 93% recirculated air at 167° F. and 7% ambient air at 70° F., a $\Delta T$ of less than 40° F. is required to raise the mixture to 200° F. Whereas, the $\Delta T$ required at 50% recirculation is over 80° F.

Dryer 12 also provides the advantage of more evenly heated inlet air. By raising the mixture of recirculated air and ambient air a relatively low $\Delta T$, the likelihood of hot spots or overheated air which may cause fabric damage is substantially reduced.

Another advantage obtained by dryer 12 is that the thermal mass has been minimized. The manner in which air is recirculated directly around drum 12 has eliminated the need for exhaust ducts and recirculatiion ducts. Further, burner 170 fires directly into the mixture of ambient air and recirculation air thereby eliminating the need for a separate burner box or heating chamber. Heat which would otherwise be wasted in heating thermal mass is utilized to evaporate moisture thereby increasing drying efficiency and shortening drying time.

The transfer of heat from exhaust air to water by condensing heat exchanger 110 is now described with particular reference to FIGS. 2 and 6. Blower 176 draws approximately 100 cfm of exhaust air over heat exchanger fins 112 in a parallel direction thereto. During steady state or second stage drying, as explained in greater detail hereinafter, the exhaust air is at an approximate temperature of 167° F. and a dew point of 135° F. The heat exchanger surface area and flow of water through tubes 114 at approximately 1 ½ gpm are matched to cool exhaust air to approximately 80° F. Both sensible heat and heat of condensation are thereby transferred from the exhaust air to the water heating the water to approximately 125° F.–130° F. Water at this high temperature is suitable for direct use in washing machines. On the other hand, if the exhaust air dew point was a conventional 90° F.–100° F., water could only be preheated to 80° F.–90° F. which is not suitable for end use.

Figure 7A:
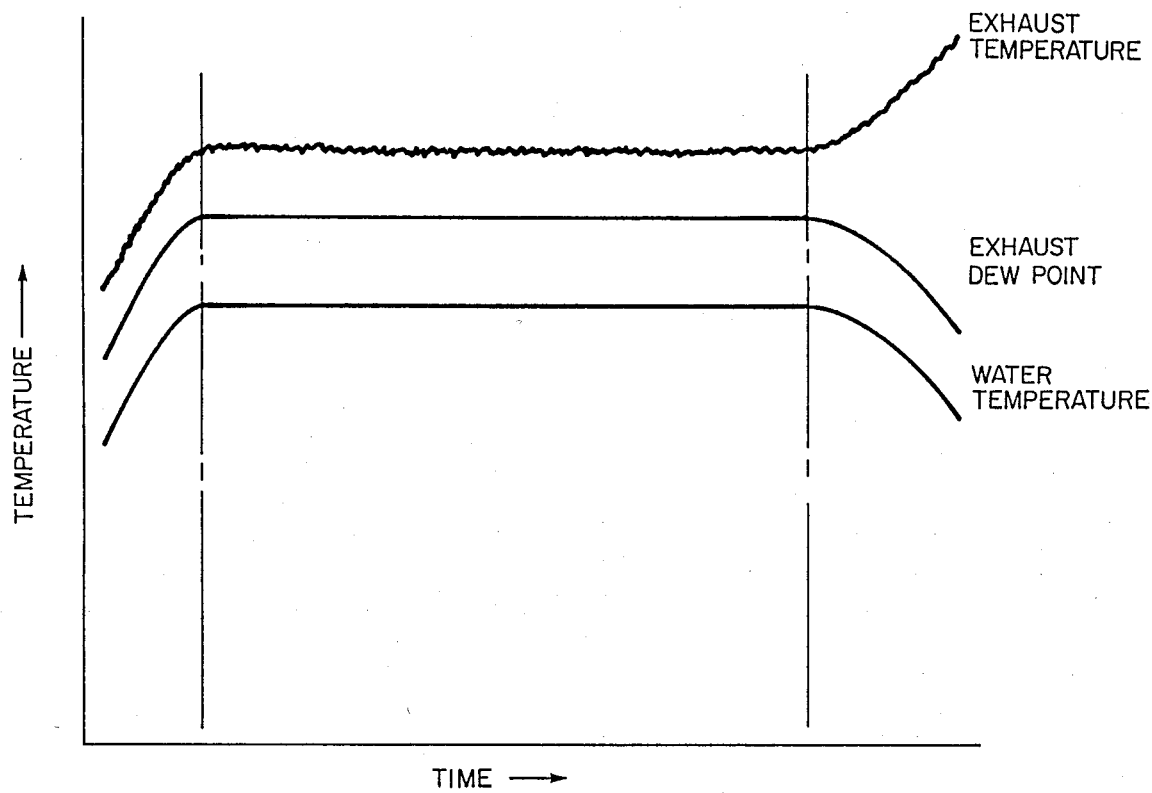
FIG. 7A is a graph of temperature versus time for exhaust air temperature, exhaust air dew point and water temperature.

Water at 125° F.–130° F., however, is only available when steady state exhaust temperatures are reached. This is illustrated by the graph of FIG. 7A wherein exhaust air temperature, exhaust air dew point and output water temperature are plotted against drying time for a constant inlet air temperature. The graph illustrates three drying stages. During the first stage, exhaust air temperature and dew point rise rapidly as the thermal mass of compartment 22, drum 12 and the clothes therein achieve steady state temperature. The second stage illustrates relatively constant temperature and dew point as heat input, less peripheral losses, matches evaporation in the wet clothes. Consequently, this stage is characterized by maximum water removal from the clothes at a relatively constant rate. During the third stage, moisture which remains embedded within the clothes fabric must first diffuse to the surface to be evaporated. Therefore, the thirds stage is characterized by slower moisture removal, higher exhaust temperatures and decreasing exhaust dew point.

Figure 7B:
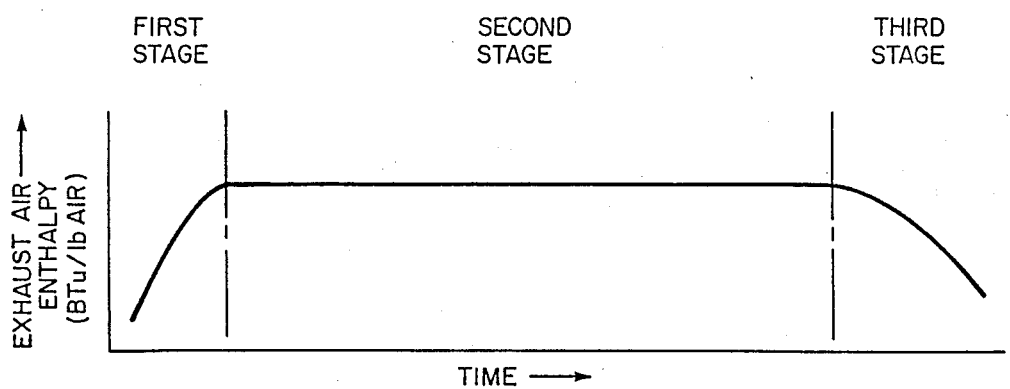
FIG. 7B is a graph of exhaust air enthalpy versus time wherein the time axis is aligned with FIG. 7A.

The graph of FIG. 7B illustrates the total enthalpy of the exhaust air during the three drying stages. As previously discussed, most of the total exhaust enthalpy consists of water vapor enthalpy due to the relatively low exhaust temperatures. Thus, total enthalpy decreases during the third drying stage when exhaust air dew point falls, even though the exhaust air temperature rises.

Since output water temperature is directly related to total enthalpy, maximum water temperatures are obtained only during second stage drying. In a laundromat application, therefore, it may be desirable to couple a thermostatically controlled valve (not shown) to the water outlet. The valve would only allow water to flow through the system when an output water temperature above a predetermined level was detected.

Referring back to FIGS. 2 and 6, the flow of condensation through heat exchanger 110 is now described. Condensation from the exhaust air forms on the upper portion of fins 112 wherein surrounding exhaust air is cooled below dew point. The condensation flows downward along fins 112 onto floor 102 and out through drain outlet 118. Consequently, substantially the entire surface area of fins 112 is covered by downwardly flowing condensate. Corrosive acids are flushed from fins 112 by the downward flowing condensate. These acids, such as hydrochloric acid, carbonic acid and hydrofluoric acid are formed when combustion gases combine with water vapor condensate. Hydrochloric acid, in particular, will corrosively attack most metals suitable for heat transfer surfaces such as copper, aluminum and stainless steel. The flushing which occurs herein is particularly effective since a portion of combustion gases are absorbed by condensate as the gasses flow upwardly over the fins. Consequently, the least acidic condensate forms at the top of fins 112. This substantially neutral condensate is the last to flow over fins 112 thereby washing away the more acidic condensate from the fins and leaving behind a substantially neutral residue.

In addition, since the entire surface area of fins 112 is covered by a film of downward flowing condensate, corrosive attack by highly acidic incipient condensate is substantially eliminated. More specifically, incipient condensation is first formed on portions of fins 112 when exhaust air initially encounters the cool surface areas of fins 112. If fins 112 were not subsequently covered with a film of condensate, the incipient condensation would gradually evaporate thereby becoming more highly concentrated and more corrosive during the drying cycle.

Besides corrosion suppression, the downward flowing condensate will flush away small lint particles which may have passed through lint screen 74. Over time, these small lint particles may otherwise clog fins 112 and impair heat recovery.

Figure 3:
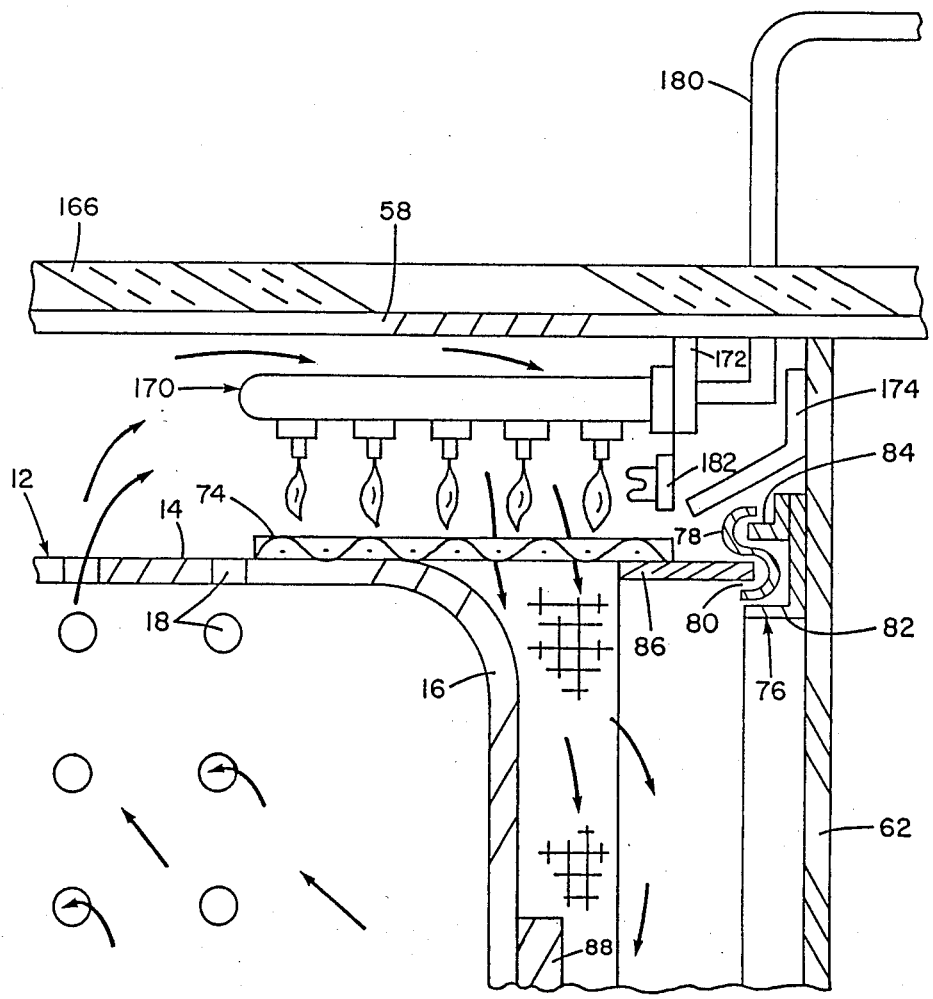
FIG. 3 is an enlarged view of a portion of FIG. 2 taken along line 3—3 of FIG. 2.

The removal and incineration of clothing lint is now described with particular reference to FIGS. 2, 3 and 5. All the air expelled from perforations 18 is radially drawn through rotating lint screen 74 depositing airborne lint thereon. Both airborne line and lint trapped on screen 74 are prevented from escaping between backwall 62 and screen 74 by seal 76. The entrapped lint is continuously incinerated as screen 74 rotates under the downwardly directed flames of burner 170. Since the circumferential area of screen 74 is relatively large, approximately 20 square feet for a standard 26 inch drum, and the lint is continuously incinerated, the distribution of lint over screen 74 is extremely sparse. Consequently, direct incineration by burner 170 results in total decomposition of the lint. Any ash or carbon residue from the lint will therefore not be perceptible.

The lint burning described hereinabove eliminates the need for manual lint cleaning. Also eliminated is any degradation of dryer performance which would otherwise occur as lint accumulation progressively inhibits air flow. These advantages are particularly important in commercial laundromats where frequent lint cleaning is not practical. Further, the lint incineration does not require additional drive components since screen 74 rotates as drum 12 rotates. In addition, the conventional ducts required for placement of operator accessible filters is avoided. This is another reason for the compactness and minimal thermal mass of dryer 10.

Dryer 10 may also be used to advantage to achieve substantially reduced drying time over conventional dryers without a loss in drying efficiency. For example, by replacing exhaust blower 156 with a 750 cfm blower, dryer 10 will operate with 50% recirculation and a drum air inlet of 1500 cfm. This is approximately twice the drum inlet air flow and the same percentage of recirculation as most conventional dryers. Assuming a 200° F. drum air inlet temperature, second stage drying is then substantially reduced by the high volume of drying air flowing across the clothes.

It is apparent from the foregoing that dryer 12 provides high recirculation without sacrifice to drying efficiency or drying time. The high recirculation results in sufficiently high exhaust enthalpy to heat hot water for end use. High recirculation also provides more evenly heated drum inle air thereby substantially reducing the possibility of fabric damage to clothing. Dryer 12 may also be adapted to provide substantially reduced drying times, at lower recirculation rates, without sacrifice to drying efficiency.

In addition, a simple compact design is provided without the ducts required to exhaust air, recirculate air and position operator accessible lint filters. Consequently, the low thermal mass descreases warm up time, increases drying efficiency and reduces the dissipation of recoverable exhaust heat.

Continuous lint incineration is also provided thereby eliminating the need for manual lint cleaning. Progressive accumulation of lint during the drying cycle which would impair air flow is also eliminated. The lint incineration is accomplished without the addition of air circulation ducts or drive components.

Although dryer 10 has been described with respect to specific details of certain preferred embodiments, it is not intended or required that such details limit the scope of the invention as set forth in the following claims. It will be apparent that various modifications and changes may be made by those skilled in the art without departing from the spirit of the invention as expressed in the accompanying claims. Hence, all matters shown and described are intended to be interpreted as illustrative and not in a limiting sense.

What is claimed is:

1. An apparatus for drying clothes, comprising:
a drum having a perforated circumferential wall and a backend with a drum air inlet;
a recirculation passageway comprising said circumferential wall, said backend, and an outer wall; and
means coupled to said drum air inlet for moving air into said drum air inlet and expelling the air through said perforations, said moving means also drawing a protion of said expelled air axially back through said recirculation passageway along said circumferential wall and then radially inward into said drum air inlet.

2. The apparatus recited in claim 1 wherein said portion of expelled air comprises over 80% of said expelled air.

3. The apparatus recited in claim 1 further comprising an ambient air inlet coupled to said drum air inlet.

4. The apparatus recited in claim 3 further comprising an exhaust outlet coupled to said recirculation passageway.

5. The apparatus recited in claim 4 further comprising means for exhausting the remaining portion of said air from said drum air outlet through said exhaust outlet.

6. The apparatus recited in claim 2 wherein said exhaust air has a dew point in excess of 120° F.

7. The apparatus recited in claim 5 further comprising:
a chamber connected to said exhaust outlet; and
a condensing heat exchanger positioned in said chamber for heating a fluid flowing in heat transfer relationship with said exhaust air, said fluid being heated by thermal transfer of both sensible heat and heat of condensation from said exhaust air.

8. The apparatus recited in claim 1 further comprising a burner coupled to said recirculation passageway.

9. An apparatus for drying clothes, comprising:
a clothes drum having a circumferential wall and an endwall, said circumferential wall having a plurality of air exit ports, said endwall having an air inlet;
a casing spacedly surrounding said circumferential wall and said endwall defining an air passageway between said casing and both said circumferential wall and said endwall; and
means for moving air into said air inlet and expelling said air radially out through said air exit ports, said air moving means also recirculating a portion of said expelled air from said air exit ports axially back through said passageway and then radially inward into said air inlet.

10. The apparatus recited in claim 9 further comprising:
an exhaust vent coupled to said air passageway; and
means for exhausting the remaining portion of said expelled air through said exhaust vent.

11. The apparatus recited in claim 10 further comprising:
a chamber coupled to said exhaust vent;
a condensing heat exchanger positioned within said chamber having at least one conduit wherein said exhaust air flows over said conduit; and
said conduit defining a water passageway through which water flows, said water being heated by thermal transfer of sensible heat from said exhaust air and from heat of condensation released as condensate from said exhaust air forms on said condensing heat exchanger.

12. An apparatus for drying clothes, comprising:
a clothes drum having a front opening, a backend with an air inlet, and a circumferential wall with perforations;
a door for sealing said front opening;
an enclosure spatially separated from and enclosing both said backend and said circumferential wall thereby defining an air passageway out of said perforations longitudinally back along said circumferential wall, radially inwardly along said backend and back into said drum inlet;
a heater positioned in said air passageway;
an ambient air inlet communicating with said air passageway; and
a fan located at said drum inlet for recirculating air from said passageway through said drum, said fan forcing air into said drum and radially out through said perforations into said passageway, said fan drawing air longitudinally back through said air passageway across said heater and into said drum inlet, said fan also drawing ambient air from said ambient air inlet across said heater and into said drum inlet.

13. The apparatus recited in claim 12 further comprising:
an exhaust outlet coupled to said air passageway;
a housing coupled to said exhaust outlet;
a condensing heat exchanger positioned within said housing having at least one conduit through which water to be heated flows; and
means for drawing the remaining portion of said expelled air through said exhaust outlet and over said condensing heat exchanger, said water being heated by thermal transfer of both sensible heat and heat of condensation from said air flowing over said condensing heat exchanger.

14. The apparatus recited in claim 13 wherein said air drawing means comprises a blower.

15. The apparatus recited in claim 12 wherein said recirculating air comprises at least 80% of the air entering said drum inlet.

16. The apparatus recited in claim 15 wherein the dew point of said expelled air is at least 120° F.

17. An apparatus for drying clothes, comprising:
a cabinet having an opening for receiving clothing;
a clothes drum having a front opening communicating with said cabinet opening, a backend and a perforated circumferential wall, said backend including a drum air inlet;
means for rotating said drum;
a housing spatially separated from and encapsulating both said drum backend and said drum circumferential wall;
an air recirculation path contiguous to both said drum circumferential wall and said drum backend, said recirculation path being defined by the spacing between said housing and both said drum circumferential wall and said drum backend;
an ambient air inlet coupled to said recirculation path;
a fan located at said drum air inlet for forcing air into said drum and expelling said air radially out through said drum perforations, said fan drawing a portion of said expelled air longitudinally back through said recirculation path and into said drum air inlet thereby recirculating said portion of said expelled air, said fan also drawing ambient air from said ambient air inlet into said drum inlet;
a heater positioned in said recirculation path;
an exhaust outlet coupled to said recirculation path; and
an exhaust blower coupled to said exhaust outlet for exhausting air from said drum by drawing the remaining portion of said expelled air from said recirculation path through said exhaust outlet.

18. The apparatus recited in claim 17 wherein said drum is positioned within said cabinet at a downward inclination from said front opening to said backend.

19. The apparatus recited in claim 17 further comprising:
a chamber coupled to said exhaust blower;
a condensing heat exchanger comprising a tube and fin heat exchanger positioned within said chamber;
said fins being positioned in said chamber in a substantially vertical direction wherein said exhaust air flows upwardly along said fins; and
said tubes forming a downward flow path wherein water to be heated flows downward through said tubes, said water being heated by thermal transfer of sensible heat from said exhaust air and from heat of condensation released as condensate from said exhaust air forms on said fins, said condensate flowing downward along said fins in a direction substantially opposite the flow of said exhaust air.

20. The apparatus recited in claim 17 wherein said recirculated air comprises at least 80% of said air entering said drum air inlet.

21. The apparatus recited in claim 17 wherein the dew point of said exhaust air is in excess of 120° F.

22. The apparatus recited in claim 17 wherein said heater comprises a gas burner.

23. The apparatus recited in claim 17 wherein said heater comprises an electric heating element.

24. The apparatus recited in claim 17 wherein said rotating means comprises a motor coupled to said drum.

25. The apparatus recited in claim 24 wherein said motor is also coupled to said exhaust blower.

26. The apparatus recited in claim 24 wherein said motor is also coupled to said fan.

27. A method for increasing the energy per unit mass of exhaust air from a dryer for heating water in a condensing heat exchanger, comprising the steps of:
forcing air into an end of a drum having a circumferential wall for evaporating moisture from clothes contained therein;
expelling air from said clothes drum;
recirculating at least 80% of said expelled air along said circumferential wall of said drum and axially back into said drum;
forcing the remaining portion of said expelled air across a condensing heat exchanger having water flowing therethrough; and
transferring both sensible heat and heat of condensation from said remaining portion of expelled air to said water.

28. A method for drying clothes in a clothes drum having a circumferential wall and a backwall with an air inlet, comprising the steps of:
forcing air axially into said drum through said air inlet in said backwall of said drum;
expelling air radially from said drum; and
drawing a portion of said expelled air back along said circumferential wall of said drum and radially inward along said drum backwall and axially back into said drum.

* * * * *